Patented Apr. 29, 1952

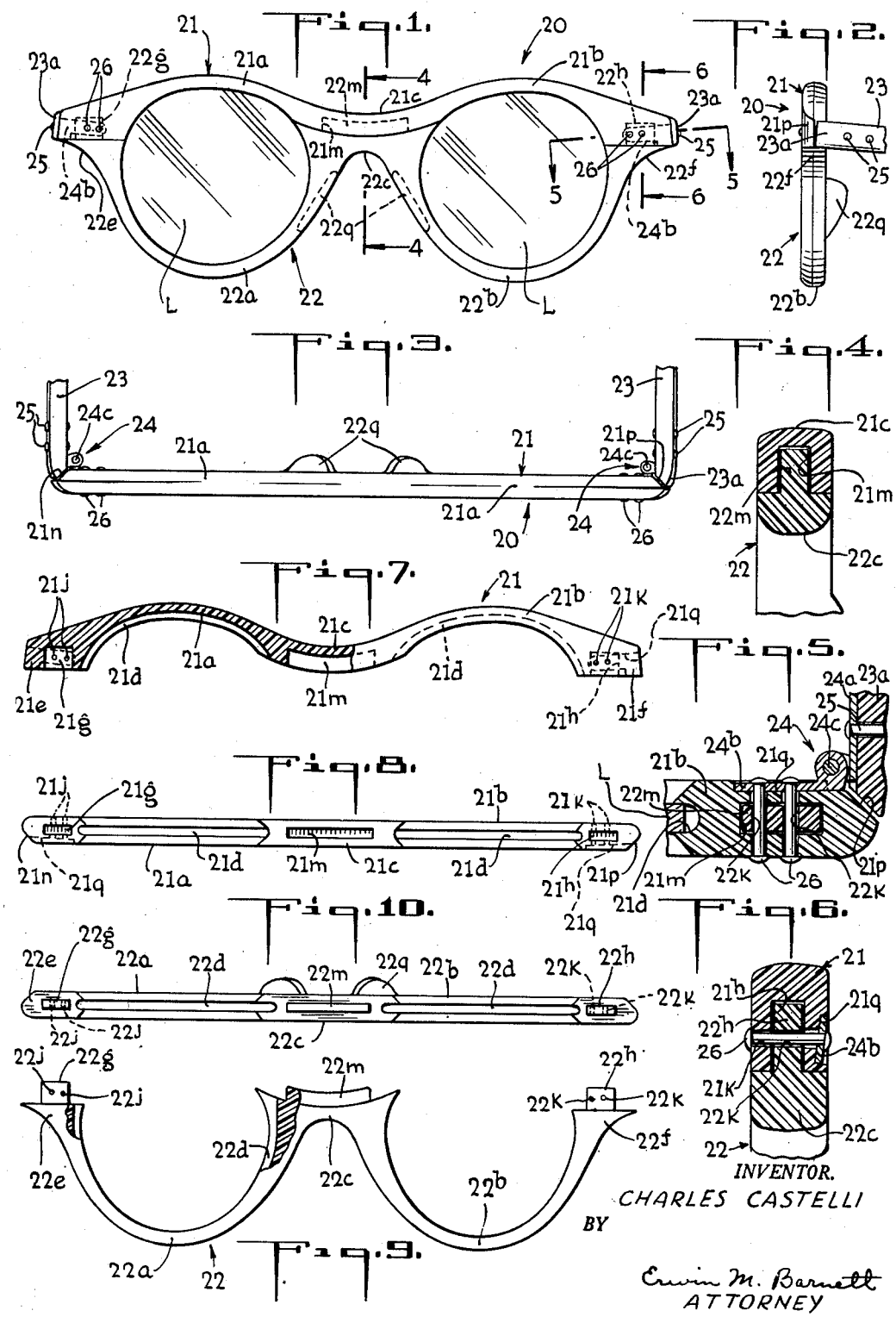

2,594,395

UNITED STATES PATENT OFFICE 2,594,395

TWO-PIECE EYEGLASS FRAME CONSTRUCTION

Charles Castelli, Union City, N. J., assignor, by mesne assignments, to Columbia Protektosite Co. Inc., Carstadt, N. J., a corporation of Delaware Application June 6, 1950, Serial No. 166,311

3 Claims. (Cl. 88—41)

1

This invention relates to eyeglass frame construction and more particularly is directed to such improved constructions each utilizing an assembly of plastic molded parts such for example as forming eyeglasses for sportswear and the like informal purposes.

Among the objects of the invention is to generally improve eyeglass frame constructions of the character described which shall comprise few and simple parts that are readily assembled into rugged structures to withstand rough usuage without requiring supplemental reinforcements, which shall be neat and pleasing in appearance and to facilitate forming different appealing fashionable effects, which shall be relatively cheap to manufacture, which shall permit easy mounting of lenses therein, which shall be efficient and practical to a high degree in use.

Other objects of the invention will in part be obvious and in part hereinafter pointed out.

The invention accordingly consists of features of construction, combination of elements and arrangements of parts which will be exemplified in the construction hereinafter disclosed, the scope of the application of which will be indicated in the claims following.

In the accompanying drawing in which one embodiment of the invention is shown,

Figs. 1, 2, and 3 are front elevational, side elevational and plan views, respectively, of an improved eyeglass frame construction embodying the invention, ends of the temple bars thereof being shown broken short.

Figs. 4, 5, and 6 are enlarged cross-sectional views taken on lines 4—4, 5—5, and 6—6, respectively, in Fig. 1 showing details of the improved assembly construction.

Fig. 7 is a front elevational view of the brow bar dismounted from the assembly shown in Figs. 1, 2 and 3, partly broken away to expose underlying structure.

Fig. 8 is a bottom plan view of the brow bar shown in Fig. 7.

Fig. 9 is a front elevational view of the lens carrier or holder piece dismounted from the assembly shown in Figs. 1 and 2, partly broken away to expose underlying structure, and Fig. 10 is a top plan view of the lens holder piece shown in Fig. 9.

In the embodiment of the invention shown in the drawing and hereinafter described, 20 denotes a completely assembled eyeglass frame construction as adapted for sportswear and like purposes, which can be utilized to form eyeglass frame construction for more conservative formal

2 purposes than that provided in the construction of eyeglass frames shown and described in my co-pending application S. N. 36,341 filed July 1, 1948, now Patent Number 2,553,496 dated May 15, 1951.

As seen from Figs. 1, 2, and 3 said frame construction 20 may be formed of a two-part lens mounting comprising an elongated brow bar 21 which may be made of molded plastic material, and when worn, normally extends downwardly from the forehead of the wearer at about the level of the eyebrows at a spaced distance above the bridge of the nose in the well understood manner, and a double lens holder or carrier piece 22 which supports and retains the desired shaped separated lenses L in position with relation to the eyes of the wearer. The lens carrier 22 may also be formed of molded plastic material as an integral unit having U-shaped rim portions 22a and 22b spaced apart by nose bridge interconnecting portion 22c, rim portions 22a and 22b each being constructed to extend partially about the peripheral border of lens L fitted therein. Said nose bridge portion 22c may be provided with suitable nose pad supports 22q.

The lens carrier 22, as seen from Figs. 1, 9 and 10 has each of the U-shaped rim portions 22a and 22b thereof provided with an internal groove 22d in which each of the spaced apart lenses L is seated. Outer opposite ends 22e and 22f of said rim portions 22a and 22b respectively, have upstanding thereon aligning ledges or tongues 22g and 22h respectively, said tongues 22g and 22h being integrally formed with the structure of the lens carrier 22, and being provided with one or more through-openings 22j and 22k respectively as is clear from Figs. 6 and 9.

Nose bridge interconnecting portion 22c of the lens carrier piece 22 may also be constructed and arranged to provide an integral upstanding ledge 22m which aligns with said ridges or tongues 22g and 22h as is shown in Figs. 4, 9, and 10.

Brow bar 21 as seen from Figs. 1, 7, and 8 may be symmetrically formed to have slight curved portions 21a and 21b to conform with rim portions 22a and 22b of the lens carrier piece 22, respectively, as required by the contour of the lenses L, said bar 21 having opposite ends thereof 21e and 21f grooved or recessed from an underside thereof, as at 21g and 21h respectively, as is clear from Figs. 1, 5 and 6.

Brow bar 21 may also have a mid-portion 21c, the central section of which is formed with a groove or recess 21m positioned and shaped to accommodate ledge 22m as is clear from Figs. 1, 4, 7, 8, 9 and 10.

Temples 23 which also may be molded of plastic materials have ends 23a thereof mounted to conform to bevelled terminal surfaces 21n and 21p of brow bar ends 21e and 21f, respectively, for pivoting movement provided by suitable hinges 24 formed of mating parts 24a and 24b, the latter being swingably interconnected together by pivot pins 24c.

Hinge parts 24a may be rigidly secured by anchoring pins or rivets 25 to temple ends 23a, and hinge parts 24b firmly secured in recesses 21q of the brow bar ends 21e and 21f by anchoring pins or rivets 26 which pass through said openings 22j and 22k in tongues 22g and 22h and aligned openings 21j and 21k in brow bar ends 21e and 21f, respectively. This latter improved construction not only retains the brow bar 21 in assembly with the lens carrier piece 22 but also secures the lenses L firmly in place yet permits readily insertion and removal of pins 26.

Ledge 22m seated in the recess 21m keeps brow bar mid portion 21c in proper alignment with the lens carrier 22 since the ledge 22m neatly fits into the brow bar recess 21m.

With the parts constructed as described above and shown in the drawing the brow bar 21 can be readily assembled to the lens carrier 22 by first fitting the lenses L in groove 22d and positioning brow bar 21 so that grooves 21d provided in curved portion 21a and 21b thereof enclose the peripheral borders of the lenses L. The ledge 22m of the carrier 22 will fit into brow bar recess 21m, and the tongues 22g and 22h fit into recesses 21g and 21h respectively. By providing passage openings 21j and 21k in the ends of brow bar piece 21 aligning with openings 22j and 22k in said tongues, respectively, for receiving the pins or rivets 26, then brow bar piece 21, carrier piece 22 and hinge parts 24b are secured firmly together and retain the temple attachment and the lenses in proper assembly.

If desired suitable adhesive may be provided on all contacting surfaces on the interfitted assembly to more firmly retain the same together.

It will thus be seen that the novel form of connection between the brow bar 21, lens carrier piece 22 with hinge parts 24b by means of pins or rivets 26 provides a simple construction for assembling frame construction 20 and for the replacement of lenses L or defective hinge parts 24a and 24b requiring a minimum of skill since said pins 26 are constructed and arranged to extend relatively normal to a plane of the front of said eyeglass 20.

It will thus be seen that there is provided an eyeglass frame construction whereby the several objects of this invention are achieved and which is well adapted to meet the conditions of practical use.

As various possible embodiments might be made of the above invention, and as various changes might be made in the embodiment above set forth, it is to be understood that all matter herein set forth or shown in the accompanying drawings is to be interpreted as illustrative and not in a limiting sense.

Having thus described my invention, I claim as new and desire to secure by Letters Patent:

1. An eyeglass frame construction assembly of the character described comprising a one-piece double lens carrier having U-shaped lens rim fitting portions spaced apart by a nose bridge integrally formed therewith, an elongated brow bar extending over said lens carrier piece formed with a mid-portion and spaced apart grooves for receiving an upper rim of each of the lenses, an integrally formed ledge upstanding from said nose bridge, said bar piece mid-portion having a recess into which the ledge is neatly fitted to retain the bar and carrier piece against movement from an alignment assembly thereof, tongue and groove interconnections between end portions of carrier and brow bar, temple hinges mounted on the end portions of said brow bar, and fastening means extending through said tongue and groove interconnections for anchoring parts of said hinges to the brow bar end portions to firmly secure the tongue and groove interconnections in proper assembly of the eyeglass frame construction.

2. An eyeglass frame construction, a one piece double lens carrier, a one-piece brow bar assembled to extend over said carrier, a tongue and groove interconnection for retaining opposite ends of said carrier and brow bar in alignment, hinge parts mounted against said brow bar ends above said carrier opposite ends, and anchoring rivets securing each of said hinge parts in mounted position and extending through said tongue and groove interconnection.

3. In an eyeglass frame construction defined in claim 2 in which said assembly of the lens carrier and brow bar align with the front of the eyeglass construction and lie in substantially a plane surface and said rivets project through the tongue and groove interconnection in a direction at right angles to said plane.

CHARLES CASTELLI.

REFERENCES CITED

The following references are of record in the file of this patent:

UNITED STATES PATENTS

| Number | Name | Date |
|---|---|---|
| 426,422 | Price | Apr. 22, 1890 |
| 1,235,842 | Reagan | Aug. 7, 1917 |
| 1,556,371 | Stiriss | Oct. 6, 1925 |
| 2,380,281 | Whipple | July 10, 1945 |